Patented Feb. 9, 1926.

1,571,945

UNITED STATES PATENT OFFICE.

HARRY M. HEIMERDINGER, OF BLACKFOOT, IDAHO.

FOOD PRODUCT.

No Drawing. Application filed October 21, 1925. Serial No. 63,863.

*To all whom it may concern:*

Be it known that I, HARRY M. HEIMERDINGER, a citizen of the United States, and resident of Blackfoot, county of Bingham, and State of Idaho, have invented certain new and useful Improvements in Food Products, of which the following is a specification.

My present invention relates to a product suitable for use as a food either by itself or as an ingredient added to other alimentary substances. The object of my improvement is to obtain from the interior or pulp portion of starchy or farinaceous or leguminous vegetables, and particularly from white (preferably Irish) potatoes, a product which will preserve the valuable properties of the original raw material, in a stable condition not appreciably affected by moisture and permitting the product to be stored without any special precautions.

When using white potatoes as the raw material, the new product is preferably made as follows: After washing it, the vegetable, in an unskinned condition, is boiled, preferably (although not necessarily) under pressure in a sealed receptacle at a temperature at or above the normal boiling point of water at the locality where the manufacture is carried out; this boiling is continued until the vegetable is thoroughly cooked, whereby the skin of the vegetable is brought to a filmy condition. The cooked vegetable is then, while hot, transferred to a container having a rigid wall provided with perforations. In this container the cooked vegetable is subjected to pressure so as to force the pulp of the potatoes through said perforations, the filmy skin and the eyes which do not pass through the perforations, being thus separated from the extruded pulp. The latter contains all the valuable constituents of the original food material, including the vitamins; more particularly, the pulp portions immediately under the skin, which are very rich in vitamins and other desirable ingredients, are made available by this treatment. In order to further improve the results obtained, I keep the material wet while it is being forced through the perforations of the container; preferably this is done by continuously supplying water to said container as long as the cooked potatoes are being forced through the perforations, the water supply being in a definite proportion to the amount of pulp. It will be understood that the water is supplied on the same side of the perforated wall as the vegetable, so that the pulp and the water will pass together through the perforations. This not only extracts and preserves some of the ingredients adhering to the skin, but keeps the material from clogging the apparatus by sticking to the perforated wall or other parts thereof, and facilitates the discharge of the skin and other matter separated from the pulp, as well as the passage of the pulp through the perforations. The pulp is in a colloidal condition.

The mixture of pulp and water discharged from the container is delivered to a receptacle provided with an agitator of any suitable construction, to produce a suspension or slurry of uniform appearance. By means of a screen or the like, this slurry is freed from any undesirable matter. The slurry, purified as just mentioned, is then pumped or otherwise delivered to a spraying and drying apparatus. For this purpose, I prefer to employ apparatus in which a whirling spray, produced by a rotary nozzle, projects the material (in this case, the slurry) by centrifugal action toward the peripheral portion of a chamber within which a current of hot air is caused to flow, the spray extending within and across such current. In my invention, the hot air may have a temperature ranging, for instance, from 500 to 600° F. The hot air dries the spray, the moisture leaving the apparatus with the hot air, while the potato product, which is dry before the spray comes in contact with the walls of the drier, is collected in a suitable part of the apparatus, as very fine whitish particles or granules. The size of these granules may be controlled by an appropriate choice of the temperature and pressure employed in the drier and of the structure adopted for the spray-nozzle. The fact that the product is whitish is due to the wet treatment now employed by me, according to which the material, at all stages of the treatment previous to the final drying, is enveloped by, or submerged in, water, so as not to be in contact with the air. In my prior Patent No. 1,295,160 I have described a food product obtained by a treatment which exposes the pulp particles to the air immediately after they have been forced through the perforations of the rigid wall, and on account of such exposure, the product of my said patent is greenish. Another important difference between the two products, also due to the fact that one is obtained by a wet treatment and the other by a substantially dry treatment, lies in fact that the old product is practically free from moisture, whereas the product of my present invention contains a substantial amount of water, which by comparison with the exceedingly small amount contained in the old product may be termed a relatively high percentage of moisture or water.

The resulting product contains from 5 to 8% of water, altered starch, a relatively high proportion of yeast food substances such as proteins and mineral salts, among them a large percentage of potassium phosphate. Its constituents will act as enzyme, activators in fermentation and allied processes, and also as catalysts in such processes.

The powder produced as described above is practically non-hygroscopic and will keep dry and serviceable for an indefinite length of time even when freely exposed to the air. Packing, shipping, and storing are thus greatly simplified. The product can be mixed readily with a large proportion of water to form a dough for making bread or other baked foods, with or without the addition of ordinary bread flours, without the mixture becoming pasty or sticky. The new potato powder may also be mixed with milk or other liquids to form beverages or food products of various kinds. For instance, with the addition of milk, or cream, the product forms a palatable breakfast food. Or, the powder may be mixed with water and the mixture warmed to obtain a food of the consistency of mashed potatoes.

The powder differs very markedly from so-called potato flour produced by other processes. In particular, its power of holding or absorbing water is much greater, that is, the new powder may be mixed with a larger proportion of water than the potato flour, without objectionable stickiness. Owing to the high temperature employed during drying, the product is sterile. Such product is in a physical condition which enables it to be mixed readily, and it does not form lumps.

As mentioned above, the new potato powder may be used with great advantage in the baking of bread and other food products for instance biscuits, crackers, sweet yeast raised goods, rolls, cookies, pies and cakes, or in the production of waffles. It may also be employed as a binder in the manufacture of sausages.

While I prefer to make my improved food product from white potatoes, satisfactory results can be obtained with the interior or pulp portion of other vegetables as the raw material, for instance sweet potatoes, yams, pumpkins, corn, beans, peas, lentils, etc.

Various modifications may be made without departing from the nature of my invention as set forth in the appended claims.

I claim:

1. A food product consisting of the cooked and dried pulp portion of a farinaceous vegetable in very finely comminuted form, said product containing from about 5 to 8% of water and a high proportion of yeast-food substances.

2. A food product consisting of the cooked and dried pulp portion of a farinaceous vegetable in the form of a non-hygroscopic sterile very finely comminuted substance containing a relatively high proportion of water and of protein.

3. A food product consisting of the cooked and dried pulp portion of potatoes in tne form of a whitish very finely comminuted substance containing from about 5 to 8% of water, and free from the skins and eyes of the potatoes.

4. A food product consisting of the cooked and dried pulp portion of a farinaceous vegetable in the form of a whitish very finely comminuted substance containing a relatively high proportion of mineral salts, protein and altered starch, and capable of absorbing a high proportion of water.

In testimony whereof I have hereunto set my hand.

HARRY M. HEIMERDINGER.